United States Patent
Ming

(10) Patent No.: US 10,169,650 B1
(45) Date of Patent: Jan. 1, 2019

(54) IDENTIFICATION OF EMPHASIZED TEXT IN ELECTRONIC DOCUMENTS

(71) Applicant: KONICA MINOLTA LABORATORY U.S.A., INC., San Mateo, CA (US)

(72) Inventor: Wei Ming, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 29 days.

(21) Appl. No.: 15/639,831

(22) Filed: Jun. 30, 2017

(51) Int. Cl.
G06K 9/00 (2006.01)
G06T 11/60 (2006.01)
G06K 9/62 (2006.01)

(52) U.S. Cl.
CPC ....... *G06K 9/00463* (2013.01); *G06K 9/6202* (2013.01); *G06T 11/60* (2013.01); *G06T 2210/12* (2013.01)

(58) Field of Classification Search
CPC ... G06K 9/00463; G06K 9/6202; G06T 11/60
See application file for complete search history.

(56) References Cited

U.S. PATENT DOCUMENTS

| | | | | |
|---|---|---|---|---|
| 5,131,053 A * | 7/1992 | Bernzott | ............ | G06K 9/00463 382/176 |
| 5,761,344 A * | 6/1998 | Al-Hussein | ........ | G06K 9/00456 382/237 |
| 5,825,919 A * | 10/1998 | Bloomberg | ........ | G06K 9/00463 382/177 |
| 2010/0199168 A1 * | 8/2010 | Balinsky | ............... | G06F 17/211 715/234 |
| 2011/0222771 A1 * | 9/2011 | Cimpoi | ............. | G06K 9/00463 382/176 |
| 2015/0278167 A1 * | 10/2015 | Arnold | ................ | G06F 17/2211 382/155 |
| 2015/0301989 A1 * | 10/2015 | Xin | ........................ | G06F 17/214 715/234 |
| 2016/0092754 A1 * | 3/2016 | Kuznetsov | ............... | G06K 9/72 382/282 |
| 2017/0098140 A1 * | 4/2017 | Wang | ................... | G06K 9/6828 |
| 2017/0098324 A1 * | 4/2017 | Srinivasan | ............. | G10L 13/08 |
| 2017/0255597 A1 * | 9/2017 | Sinn | ...................... | G06F 17/214 |

OTHER PUBLICATIONS

Chaudhuri et al, "Automatic Detection of Italic, Bold and All-Capital Words in Document Images", 1998, Pattern Recognition, Proceedings. Fourteenth International Conference on, vol. 1, pp. 610-612 (Year: 1998).*

Yadav et al., "Detection of Bold and Italic Character in Devanagari Script", International Journal of Computer Applications (0975-8887), vol. 39, No. 2, pp. 19-22, Feb. 2012, 4 pages.

* cited by examiner

*Primary Examiner* — David F Dunphy
(74) *Attorney, Agent, or Firm* — Squire Patton Boggs (US) LLP

(57) ABSTRACT

To identify emphasized text, bounding boxes are based on clusters resulting from horizontal compression and horizontal morphological dilation. The bounding boxes are processed to determine if any contain words or characters in bold. A bounding box is eliminated based on a comparison of its density and an average density across all bounding boxes. If its density is greater, text elements within the bounding box are evaluated to determine whether the text element is bold.

21 Claims, 18 Drawing Sheets

Customer
•Corporate users which want to distribute "information in document" form to other people in their corporation or outside their corporation.

Current problem/ Potential future problem
•A given individual receives many documents that they may need to decided whether to read thoroughly/skim through/keep for reference in the future.

Customer value
•Improve decision making for importance to read.
•Increase efficiency of office knowledge distribution.

How to realize (Major technologies)
•Hosted document platform.
•Plugin into document distribution methods integration into web based email application.
•Document summarization algorithm

MAJOR TECHNOLOGY
Step1: extracted known sentences
Step2: create sentence cohesion
Step3: create SUMMARY CONNTENT

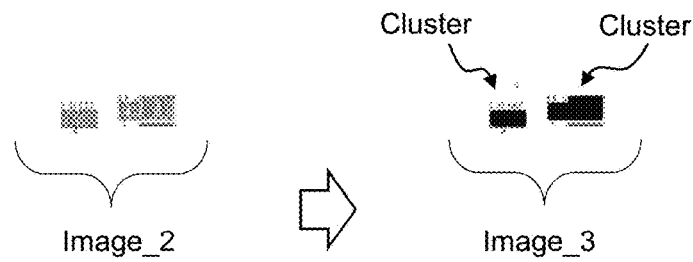
FIG. 12
FIG. 13
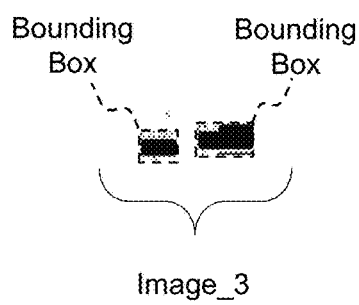
FIG. 14
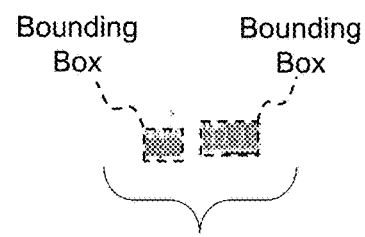
FIG. 15

IDENTIFICATION OF EMPHASIZED TEXT IN ELECTRONIC DOCUMENTS

FIELD

This disclosure relates generally to image processing and, more particularly, to processing of images containing text.

BACKGROUND

Sheets of paper containing text may be put through a scanner to create an electronic document with each page having a text image. The scanner could output the text image in any digital format, such as PDF (Portable Document Format), JPEG (Joint Photographic Experts Group), GIF (Graphics Interchange Format), TIFF (Tagged Image File Format), PNG (Portable Network Graphics), or others. Typically, a scanning process does not encode the text image in a way that tags words or characters having stylistic emphasis, such as underlining and bold. It may be desirable in some situations to identify words or characters having stylistic emphasis, referred to herein as emphasized text. Upon tagging, emphasized text can be the subject of further processing. For example, a system may perform a character recognition process that considers only the emphasized text in order to generate a brief abstract of the document without having to process other words in the document. Computing resources are conserved and processing could take less time if other text (non-emphasized text) are ignored by the character recognition process. Even in cases where computational cost is not a driving concern, lower recognition accuracy on emphasized text can be an issue in many character recognition (OCR) software. Accuracy can be even worse when there is a mixture of text styles on the text image. Thus, identification of emphasized text may allow a different character recognition algorithm to be applied to emphasized text to improve character recognition accuracy. In another example, a person using a computer to read the electronic document may want to jump directly to the emphasized text within the electronic document, in which case, the electronic document need not be subjected to any character recognition process. Accordingly, there is a need for a method and system for identifying emphasized text in an efficient and effective way.

SUMMARY

Briefly and in general terms, the present invention is directed to a method, system, and non-transitory computer readable medium for identifying emphasized text.

In aspects of the invention, a method comprises performing horizontal compression on an input image to generate a horizontally compressed image, the input image comprising lines of text, each line of text comprising a plurality of words or characters; performing horizontal morphological dilation on the compressed image to form a horizontally dilated image, the horizontally dilated image comprising clusters, each cluster corresponding to a different one of the lines of text; calculating a bounding box for each cluster, resulting in a plurality of bounding boxes; calculating a first average density, the first average density calculated across all the bounding boxes; for each of the bounding boxes, comparing the first average density to a density of the bounding box; and identifying a specific bounding box, from among the plurality of bounding boxes, as having a word or character in bold, the identifying based on the comparison of the first average density to the density of the specific bounding box.

In aspects of the invention, a system comprises a processor, and a memory device in communication with the processor, the memory device storing instructions. The processor is configured to perform a process to identify emphasized text according to the stored instructions. The process comprises performing horizontal compression on an input image to generate a horizontally compressed image, the input image comprising lines of text, each line of text comprising a plurality of words or characters; performing horizontal morphological dilation on the compressed image to form a horizontally dilated image, the horizontally dilated image comprising clusters, each cluster corresponding to a different one of the lines of text; calculating a bounding box for each cluster, resulting in a plurality of bounding boxes; calculating a first average density, the first average density calculated across all the bounding boxes; for each of the bounding boxes, comparing the first average density to a density of the bounding box; and identifying a specific bounding box, from among the plurality of bounding boxes, as having a word or character in bold, the identifying based on the comparison of the first average density to the density of the specific bounding box.

In aspects of the invention, a non-transitory computer-readable medium has stored thereon computer readable instructions that, when executed by a processor of a system, cause the system to perform a process for identifying emphasized text. The process comprises performing horizontal compression on an input image to generate a horizontally compressed image, the input image comprising lines of text, each line of text comprising a plurality of words or characters; performing horizontal morphological dilation on the compressed image to form a horizontally dilated image, the horizontally dilated image comprising clusters, each cluster corresponding to a different one of the lines of text; calculating a bounding box for each cluster, resulting in a plurality of bounding boxes; calculating a first average density, the first average density calculated across all the bounding boxes; for each of the bounding boxes, comparing the first average density to a density of the bounding box; and identifying a specific bounding box, from among the plurality of bounding boxes, as having a word or character in bold, the identifying based on the comparison of the first average density to the density of the specific bounding box.

The features and advantages of the invention will be more readily understood from the following detailed description which should be read in conjunction with the accompanying drawings.

BRIEF DESCRIPTION OF THE DRAWINGS

FIG. 5 is a representation of an example input image (Image_0) that does not contain Asian language text, the input image for use in any process described herein.

FIG. 7 is a representation of an example input image (Image_0) that contains Asian language text, the input image for use in any process described herein.

FIG. 12 shows a portion of FIG. 6 before and after horizontal morphological dilation, and showing clusters formed by horizontal morphological dilation.

FIG. 13 shows text at a portion of FIG. 5 corresponding to the horizontally compressed text in FIG. 12.

FIG. 14 shows bounding boxes calculated from the clusters in FIG. 12.

FIG. 15 shows horizontally compressed text corresponding to the bounding boxes calculated in FIG. 14.

DETAILED DESCRIPTION

As used herein, the phrase "Asian language text" refers to text that mostly contains logograms, syllabic kana, and the like. A logogram is a character that represents a word or phrase. Examples of logograms are Chinese characters and Japanese kanji characters. Syllabic kana includes hiragana and katakana, which are part of the Japanese writing system. The phrase "Asian language text" does not encompass text of some languages in Asia when written using mostly letters from a Roman-based alphabet. Examples of languages in Asia that can be written using mostly letters from a Roman-based alphabet include Tagalog (in the Philippines), Malay, and Vietnamese.

As used herein, "bold," "bolded," and "in bold" refer to a style of emphasis in which letters or characters are thicker than others in the document.

Figure 1:
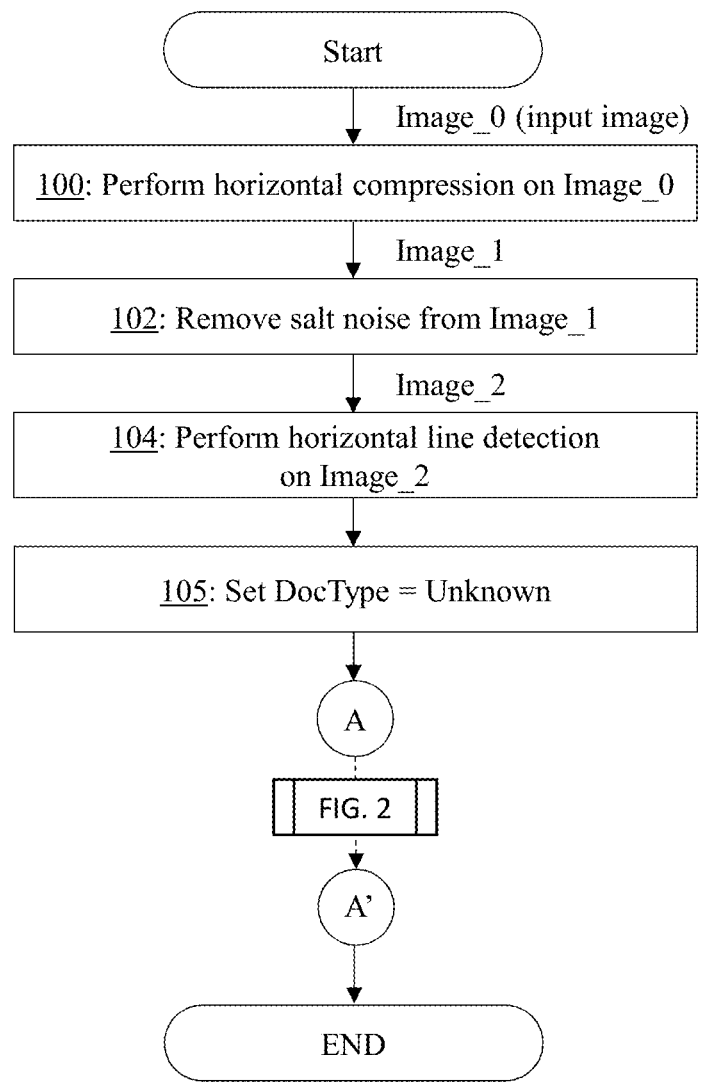
FIG. 1 is a flow diagram showing an example process for identifying emphasized text in an electronic document.
Figure 2:
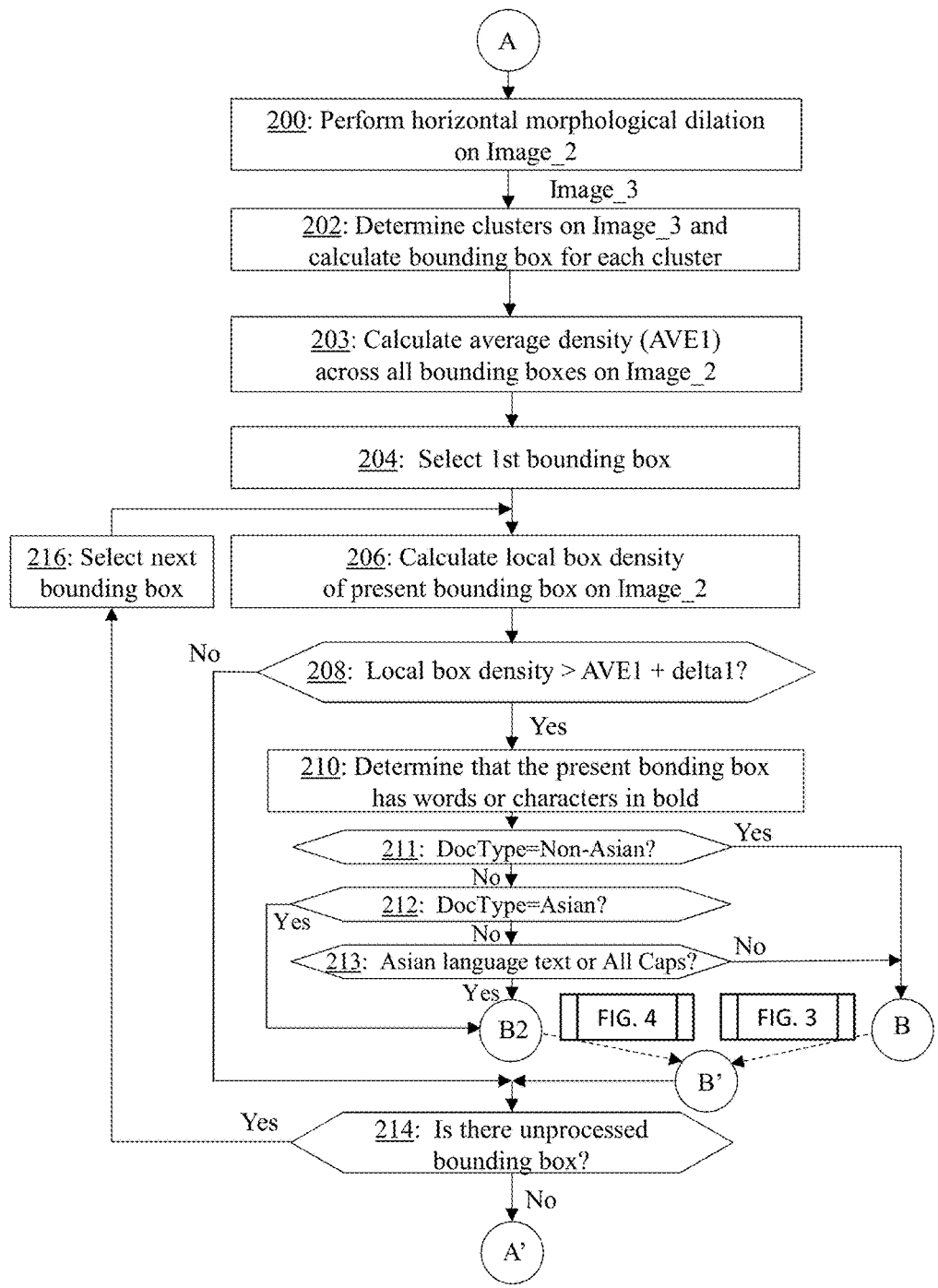
FIG. 2 is a flow diagram showing a subprocess of FIG. 1.

Referring now in more detail to the example drawings for purposes of illustrating aspects of the invention, wherein like reference numerals designate corresponding or like elements among the several views, there is shown in FIG. 1 an example method for identifying emphasized text in an electronic document. FIG. 1 has break A-A', which corresponds to FIG. 2. FIG. 2 has break B-B' which corresponds to FIG. 3. Also, FIG. 2 has break B2-B' which corresponds to FIG. 4.

At block 100 in FIG. 1, an input text image is horizontally compressed, so the horizontal extent of the image (image width) is reduced. Vertical compression is not performed, so the vertical extent of the image (image height) is not reduced. The input text image can be in a digital format, such as PDF, JPEG, GIF, TIFF, PNG, or others. The input text image is also referred to as Image_0, and the result of horizontal compression of Image_0 is referred to as Image_1. Image_0 includes text and optionally pictures, such as photographs or illustrations. Image_0 has not been encoded in a way that distinguishes words or characters that have stylistic emphasis from words or characters that do not have stylistic emphasis. Examples of stylistic emphasis include underline and bold. Words or characters with stylistic emphasis are referred to herein as emphasized text.

Optionally, Image_0 has not been encoded by a character recognition process. In which case, Image_0 has not been encoded in a way that distinguishes groups of pixels as being a particular Asian character or particular letter.

Horizontal compression at block 100 can be performed in various ways. Applicant has found that horizontal compression can be performed without significant adverse effect on subprocesses described below while conserving computing resources and reducing the time required to complete the process for identifying emphasized text.

In an example of a horizontal compression process, Image_0 is divided into vertical segments, each one pixel wide. Groups of N vertical segments are transformed into one vertical segment that is one pixel wide, referred to as the resultant segment. For example, with N=4, a first group of four vertical segments is transformed into a first resultant segment, the next group of four vertical segments is transformed into a second resultant segment, and so on. Averaging or other algorithm is applied to the four vertical segments to determine the value (black or white) of individual pixels in the resultant segment.

In another example of a horizontal compression process, Image_0 is divided into vertical segments. Segments are alternatingly removed. For example, the first segment remains, the second segment is removed, the third segment remains, the fourth segment is removed, and so on. Each segment that remains can have a horizontal dimension that is W1 pixels wide. W1 can be 1, less than 5, or other value. Each segment that is removed can have a horizontal dimension that is W2 pixels wide. W2 can greater than 1, greater than 5, or value. Other horizontal compression processes can be used.

Figure 6:
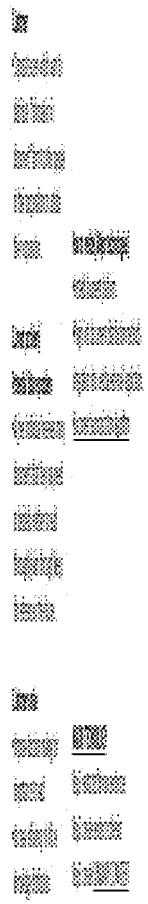
FIG. 6 is a representation of an example result of horizontal compression on the input image of FIG. 5.

FIG. 5 shows an example input image, Image_0, which contains emphasized words. For example, some words, such as "Customer value," are bolded. Other words, such as "Document summarization algorithm" are underlined. The words "MAJOR TECHNOLOGY" are bolded and underlined. FIG. 6 shows an example of a horizontally compressed image, Image_1, that is the result of block 100 applied to Image_0 of FIG. 5. Individual words in Image_1 may not be intelligible.

Figure 8:
FIG. 8 is a representation of an example result of horizontal compression on the input image of FIG. 7.

FIG. 7 shows an example input image, Image_0, having Asian language text. There are three paragraphs, and characters in the paragraph headings are bolded. Also, some characters in the headings are bolded and underlined. FIG. 8 shows an example of a horizontally compressed image, Image_1, that is the result of block 100 applied to Image_0 of FIG. 7. Individual characters in Image_1 may not be intelligible.

Figure 9:
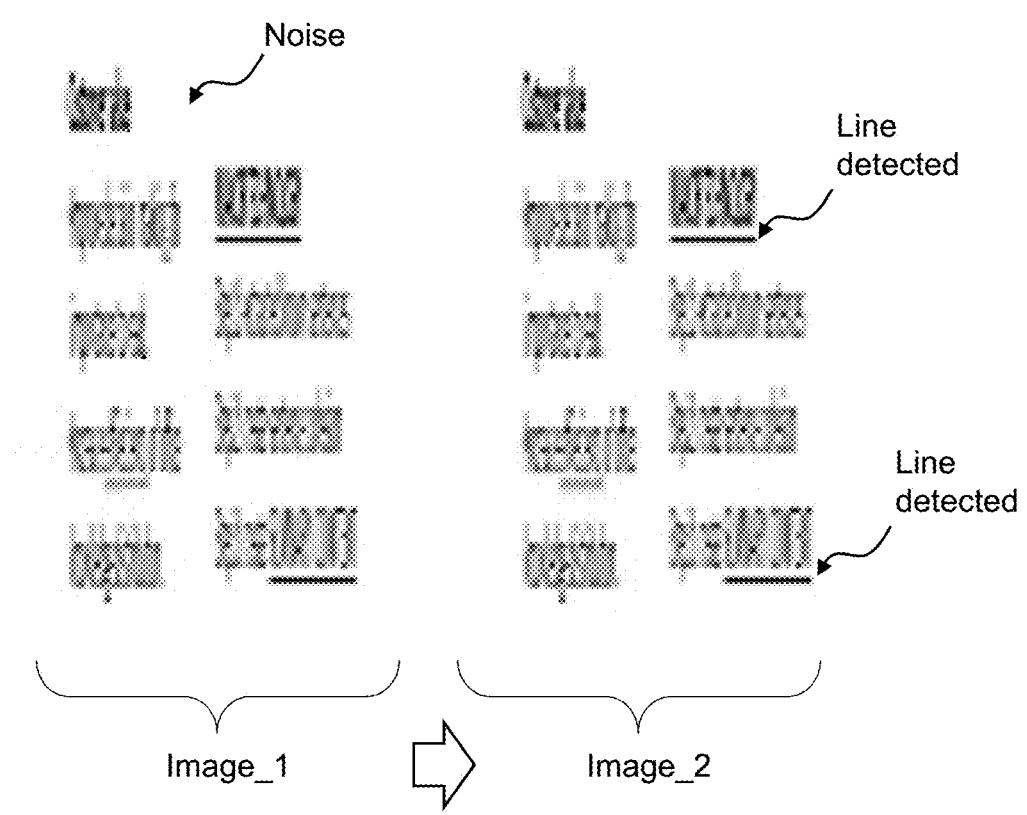
FIG. 9 shows a close-up of a portion of FIG. 6 before and after noise removal.

At block 102, salt noise is removed from Image_1 to generate Image_2. Salt noise, also referred to in the art as impulse noise, presents itself as sparsely occurring white and/or black pixels. Various filtering algorithms known in the art can be used at block 102 to remove salt noise. Applicant has found that removal of salt noise at this stage can increase the accuracy of certain subprocesses described below. FIG. 9 shows an example of salt noise removal. The left side of the figure shows Image_1, which is a close-up of the bottom portion of FIG. 5. The right side of the figure shows Image_2, that is the result of block 102. Both Image_1 and Image_2 are examples of a horizontally compressed image which have not been vertically compressed.

At block 104, horizontal line detection is performed on Image_2. For example, an algorithm can be used to look for a horizontal series of connected pixels that form a narrow dark area having a horizontal length-to-vertical height ratio, R, that is very high. The algorithm can compare R to a threshold value and identify the connected pixels as an underline when R is greater than the threshold value. Additionally or alternatively, other criteria can be used, such as straightness and length, to identify the connected pixels as an underline. A line detection algorithm known in the art may be used. For example, Hough Transform or Line Segment Detector (LSD) may be used. Referring again to FIG. 9, the right side of the figure shows Image_2 with two underlines having been identified at block 104.

Figure 24:
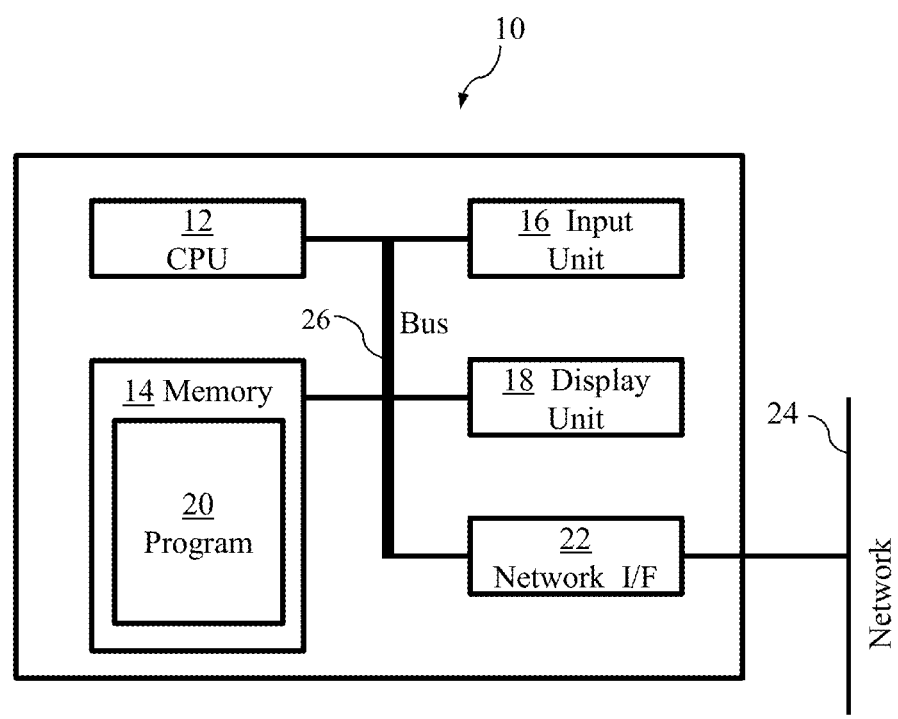
FIG. 24 is a block diagram of a system for performing the processes of FIGS. 1 and 21.

When an underline is detected at block 104, location and/or contents of the word associated with the underline may be saved in memory device 14 (FIG. 24). The location can be a page number, line number, and/or coordinates in a page. For example, the location and/or contents may be saved in a lookup table in memory device 14. Alternatively or additionally, an output image (Image_X) may be encoded with a tag that distinguishes the underline location in the input image (Image_0) from other regions in the input image as having a word or character in bold. The tag may include a page number, line number, and/or coordinates in a page.

At block 105, a document type variable (DocType) is initialized. DocTyp is set to Unknown.

From block 105, the process proceeds to FIG. 2. At block 200 in FIG. 2, a horizontal morphological dilation is performed on Image_2 to generate Image_3. Image_3 is an example of a horizontally dilated image. In general, morphological dilation expands the boundaries of a subject, such as a foreground element of an image. The subject appears thicker after morphological dilation. As known in the art, algorithms for morphological dilation may use a structuring element to enlarge boundaries.

Figure 10:
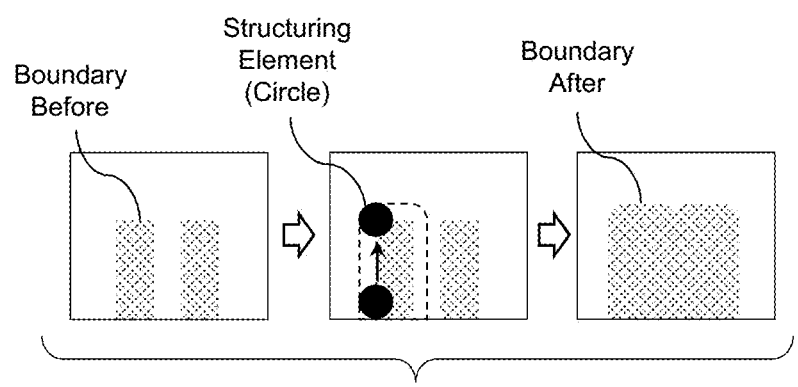
FIG. 10 is a diagram showing progression of an example morphological dilation in horizontal and vertical directions.
Figure 11:
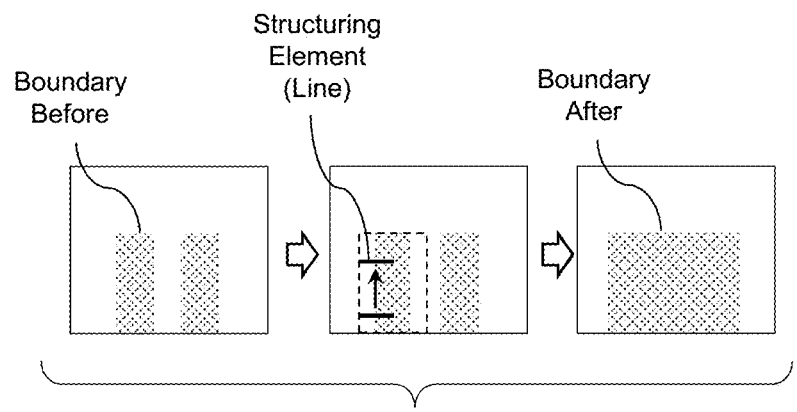
FIG. 11 is a diagram showing progression of an example morphological dilation in the horizontal direction.

As shown in FIG. 10, a circle structuring element can be applied along the boundary edges of letter or characters to expand the boundaries in both horizontal and vertical directions. In horizontal morphological dilation, boundaries are expanded in the horizontal direction but not in the vertical direction. As shown in FIG. 11, when performing horizontal morphological dilation, a thin horizontal line can be used as structuring element applied along the boundary edges of letters of characters.

FIG. 12 shows an exaggerated example of horizontal morphological dilation for discussion. The left side of the figure shows the bottom section of Image_2. The right side of the figure shows the same section of Image_2 after horizontal morphological dilation. The compressed text in FIG. 12 correspond to the two lines of text shown in FIG. 13. Horizontal morphological dilation performed on compressed text has the effect of filling horizontal gaps between letters or characters. As a result, individual characters merge together, and individual words merge together. For example, one line of text ("knowledge distribution.") in Image_0 of FIG. 13 has been transformed into one cluster in Image_3 of FIG. 12, and another line of text ("Step3: create SUMMARY CONNTENT") has been transformed into another cluster. Applicant has found that these clusters reliability represent a line of text from which to calculate a bounding box.

At block 202 in FIG. 2, the clusters in Image_3 are determined. In other words, clusters are identified throughout Image_3. After a cluster is identified, its bounding box is calculated. The term "bounding box" as used herein refers to a boxed region of minimum area having a rectangular perimeter enclosing a cluster. That is, the bounding box is the smallest possible box that encloses pixels of a cluster. The bounding boxes identified in Image_3 do not overlap. FIG. 14 shows the outline of example bounding boxes that have been calculated at block 202 for two clusters.

At block 203, average density (AVE1) across all bounding boxes is calculated from Image_2 instead of Image_3. Both Image_2 and Image_3 are horizontally compressed, but only Image_3 was subjected to morphological dilation to generate clusters from which bounding boxes are calculated. Now at block 203, Image_2 is used to get the average density of each line of text based the bounding box calculated from Image_3. FIG. 15 shows the bounding boxes placed on Image_2 when calculating AVE1.

AVE1 can be calculated as the sum of normalized pixel values added together from all bounding boxes on Image_2, divided by the total number of all pixels (black and white) added together from all bounding boxes on Image_2. Other averaging techniques can be used to calculate AVE1 across all bounding boxes.

An example process for calculating the sum of normalized pixel values is as follows. Pixels can have values from 0 to Max (for example, Max=255 for grayscale pixels). Each pixel value is normalized by dividing the pixel value by Max to obtain a quotient. The sum of normalized pixel values is the sum of all the quotients.

AVE1 is an example of a first average density. AVE1 is computed from Image_2, not image 3. This arises from the bounding boxes being on Image_2, which is a horizontally compressed image.

At block 204, a loop begins for determining whether the bounding boxes contain words in bold. The loop begins with the first bounding box, and subsequent process blocks are repeated until all bounding boxes have been processed. The loop is an example of a process for comparing the average density (AVE1) to a density of each of the bounding boxes.

At block 206, the density of the portion of Image_2 within the current bounding box is calculated. This is referred to as the local box density. The local box density can be calculated as the sum of normalized pixel values in the current bounding box on Image_2, divided by the total number of all pixels (black and white) in the current bounding box on Image_2. Other averaging techniques can be used to calculate the local box density.

At block 208, the local box density is compared to AVE1. At block 208, it is possible to calculate the difference between the local box density and AVE as local box density minus AVE1. The result of block 208 is no (block 208:NO) if the difference exceeds a threshold (delta1). The result of block 208 is yes (block 208:YES) if the difference exceeds the threshold.

If the local box density is not greater than AVE1+delta1 (block 208:NO), it is determined that the current bounding box does not contain words in bold, and the process proceeds to block 214. At block 214, the process checks whether there is another bounding box that remains to be processed. If not (block 214:NO), the process returns to FIG. 1 and may end. If yes (block 214:YES), the next bounding box is processed.

If the local box density>AVE1+delta1 (block 208:YES), it is determined at block 210 that the current bounding box contains words or characters that are bold. An output image (Image_X) may be encoded with a tag that distinguishes a bold region in the input image (Image_0) from other regions in the input image as having a word or character in bold. The bold region corresponds to an area in the current bounding box. The tag may include a page number, a line number, and or coordinates of the current bounding box.

The process proceeds by identifying the particular words or characters in bold; however, the process differs depending on whether the current bounding box contains Asian language text.

At blocks 211 and 212, the process checks whether the document type (DocType) has been identified as Non-Asian or Asian. At block 105 in FIG. 1, DocType was set to Unknown, so the process proceeds to block 213. (The significance of blocks 211 and 212 will become apparent later with respect to FIG. 21.)

At block 213, the process checks whether the current bounding box contains Asian language text. The process may check whether an area of the image corresponding to the current bounding box contains a horizontal center zone of greater density than upper and/or lower horizontal zones. The image used for this purpose may be Image_0 or Image_2. If there is a horizontal center zone of greater density, then it is determined that the current bounding box does not contain Asian language text (block 213:NO). If there is no horizontal center zone of greater density, then the current bounding box contains Asian language text or text having all upper case letters (block 213:YES). The phrase "All Caps text" refers to text having all upper case letters, such as A, B, C instead of a, b, c.

Figure 16A:
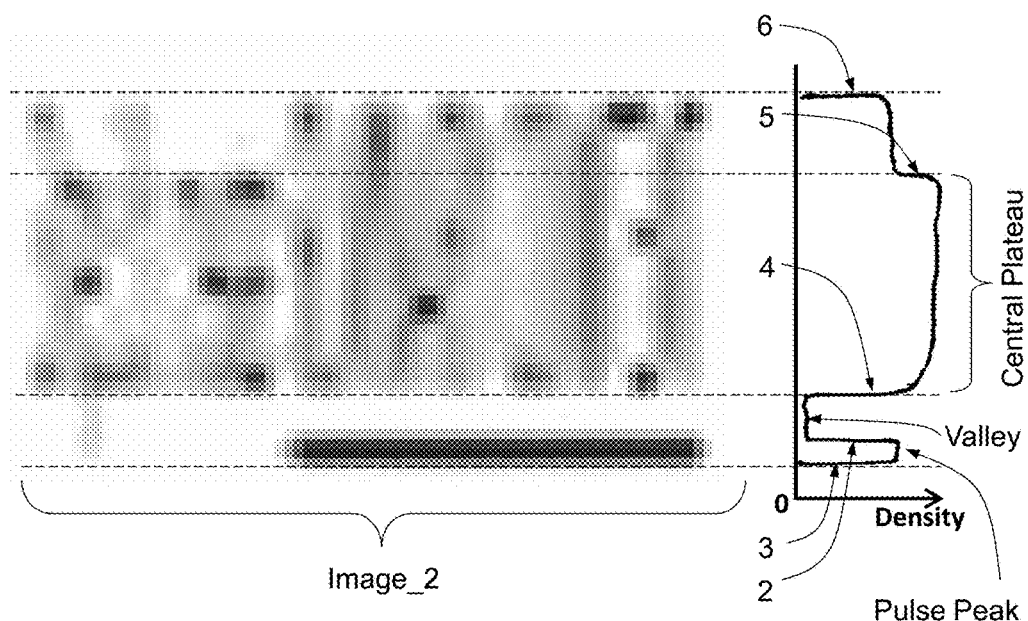
FIG. 16A shows horizontally compressed text and a corresponding projection with a density distribution curve indicating that the text has a horizontal center zone of greater density than upper and lower zones.

FIG. 16A shows example text within an area of Image_2 that may correspond to the current bounding box. The current bounding box contains the words "Step3: create SUMMARY CONNTENT" which have been horizontally compressed. A density curve is calculated for the area in the current bounding box on Image_2. FIG. 16A shows a graph having a vertical axis corresponding to the vertical direction in the bounding box. The horizontal axis corresponds to density. Each point on the curve represents an aggregate density value of the pixels located at the same vertical position within the current bounding box. All pixel values at the same vertical position within the current bounding box are used to calculate the aggregate density value.

For example, each aggregate density value can be the average of pixel values at the same vertical position within current bounding box. Pixels can have values from 0 to Max, and each aggregate density value equals the average of all pixel values at the same vertical position within current bounding box. For grayscale pixels, Max could be 255. Alternatively, the aggregate density value can be sum of pixel values at the same vertical position within current bounding box. Alternatively, the pixel values can be normalized. For each pixel value, normalization includes dividing the pixel value by Max to obtain a quotient. Then each aggregate density value is calculated as the sum of quotients corresponding to the same vertical position within current bounding box.

The density curve includes rapid drops 2, 3, 4, 5, and 6. Rapid drops that are spaced close together at the bottom of the bounding box, such as drops 2 and 3 are deemed to correspond to a pulse peak representing an underline. Thus, an underlined is identified when a pulse peak is present in the density curve.

Rapid drops at opposite sides of a central plateau, such as drops 4 and 5, are deemed to correspond to a center zone of the bounding box having greater density than upper and lower horizontal zones of the bounding box. That is, a center zone of greater density is identified when the density curve has rapid drops on opposite sides of a central plateau.

The process may check whether there is a valley in the density curve. That is, the process may check whether at least N points (N pixel locations, for example) on the density curve is zero or near to zero between the impulse peak and the remainder of the bounding box contents. N may be 1, 5, 10, or other number. In effect, this checks whether an underline (represented by the impulse peak, for example) is apart from the center zone of text (represented by the remainder of the density curve, for example). In FIG. 16A, several points on the density curve is close to zero between the impulse peak and the remainder of the density curve, so the underline is apart from the text.

If an underline is detected, non-Asian language text is identified at block 213 when the underline is apart from the text. If the underline is not apart from the text, the result at block 213 is YES, meaning that Asian language text is identified.

If no underline is detected, Asian language text or All Caps text is identified at block 213 when there is no center zone of greater density. If there is a center zone of greater density, the result at block 213 is NO, meaning that Non-Asian language text (not Asian language text and not All Caps text) is identified.

In the example of FIG. 16A, Non-Asian language text (not Asian language text and not All Caps text) is identified at block 213. The current bounding box in this example contains the words "Step3: create SUMMARY CONNTENT" from Image_0, which have been horizontally compressed. SUMMARY CONNTENT was underlined. In the density curve, the valley is detected.

Figure 16B:
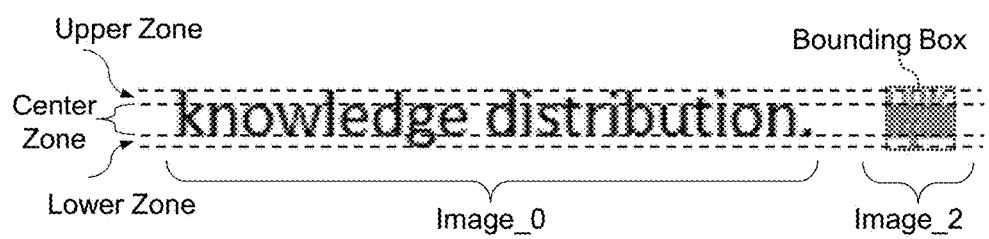
FIG. 16B shows text having a horizontal center zone of greater density than upper and lower zones.

FIG. 16B shows another example text within areas of Image_0 and Image_2 that may correspond to the current bounding box. These areas of Image_0 and Image_2 do not include an underline. Also, there exists a horizontal center zone of greater density than upper and lower horizontal zones, so it is determined that the areas do not contain Asian language text (block 213:NO). The horizontal center zone may be identified in the manner discussed for FIG. 16A. The upper zone contains a fractional top part of the word "knowledge," in particular the top parts of the letters k, l, and d. The bottom zone contains a fractional bottom part of the word "knowledge," in particular the bottom part of the letter g.

Figure 17:
FIG. 17 shows Asian language text without a horizontal center zone of greater density than upper and lower zones.

FIG. 17 shows another example of text within areas of Image_0 and Image_2 that may correspond to the current bounding box. These areas of Image_0 and Image_2 do not include an underline. Also, there is no horizontal center zone of greater density, so it is determined that the areas contain Asian language text or All Caps (block 213:YES). It is expected that areas of Image_0 and Image_2a for a current bounding box containing All Caps (for example, a bounding box containing the words "MAJOR TECHNOLOGY" in FIG. 5) would not have a center zone of greater density, so the result of block 213 would be YES.

Figure 3:
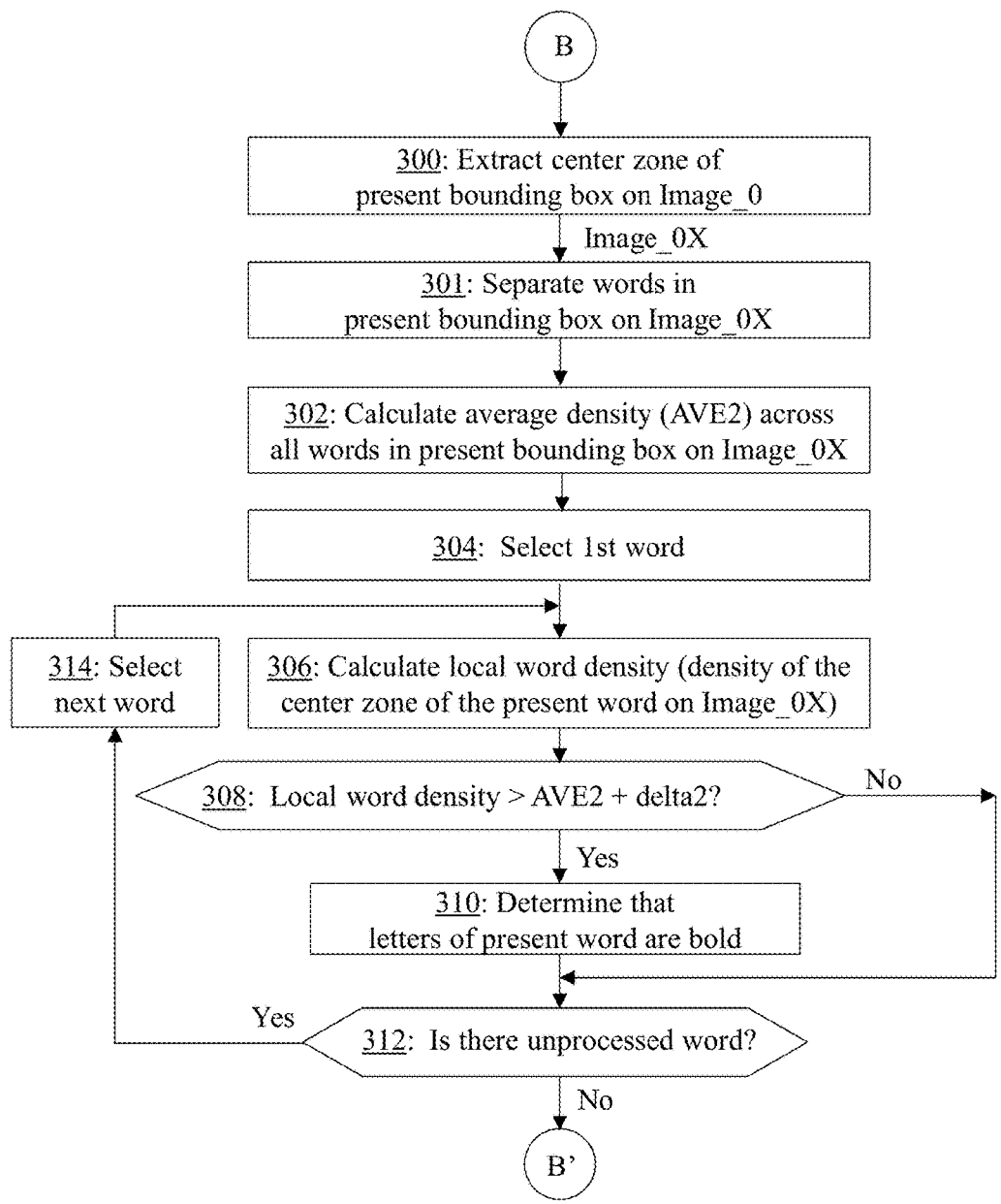
FIG. 3 is a flow diagram showing a subprocess of FIG. 2.

If the result at block 213 is NO, then the process proceeds to FIG. 3. When at FIG. 13, it has already been ascertained at block 210 that the current bounding box (which represents a line of text) contains letters or characters that are bold and that it does not contain Asian language text.

Figure 18:
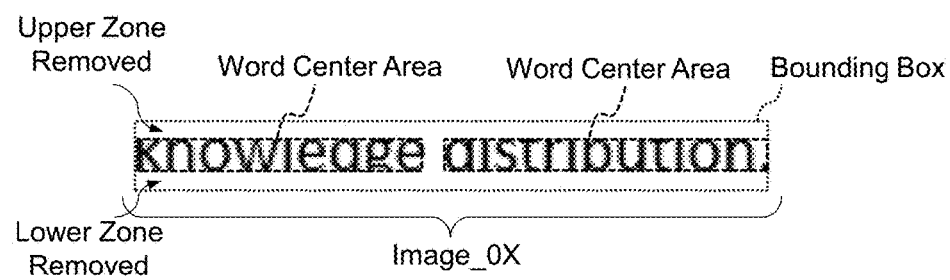
FIG. 18 shows a horizontal center zone extracted from FIG. 16B.

At block 300 in FIG. 3, the horizontal center zone of the present bounding box is extracted from the area of Image_0 to generate Image_0X, as shown in FIG. 18. Upper and lower zones of bounding boxes are eliminated from Image_0 to generate Image_0X. The fractional top or bottom parts of letters k, l, d, g, t, i, and b have been clipped off.

At block 301, words are separated. Each group of letters situated relatively close to each other is identified as a word.

The areas occupied by the words are referred to as word center areas since the upper and lower zones have been eliminated. FIG. 18 shows examples of two word center areas that have been identified in a portion of Image_0X. The extent of a word center area may be the smallest possible box that encloses the clipped letters of the word.

The words in each bounding box are examples of text elements. The word center area is an example of a text element area. The current bounding box is divided by numerous text element areas (word center areas), which may not cover the current bounding box entirely. For example, spaces between words may be excluded from word center areas to increase effectiveness and efficiency of subsequent subprocesses at blocks 302, 306, and 308.

At block 302, an average density (AVE2) is calculated across all word center areas in the current bounding box. The current bounding box is defined at block 204 or 216 of FIG. 2. AVE2 can be calculated as the sum of normalized pixel values added together from all word center areas in the current bounding box on Image_0X, divided by the total number of all pixels (black and white) added together from all word center areas in the current bounding box on Image_0X. Other averaging techniques can be used to calculate AVE2 across all word center areas. Image_0X is the same as Image_0 except that upper and lower zones are absent from Image_0X.

AVE2 at block 302 is an example of a second average density. AVE2 is calculated from Image_0X. This arises from the bounding boxes being on Image_0X, which is not a horizontally compressed image. None of the upper zones and none of the lower zones are used in the calculating AVE2 at block 302.

At block 304, a loop begins for determining whether words are bolded. The loop begins with the first word center area, and subsequent process blocks are repeated until all word center areas have been processed. The loop is an example of a process for comparing a second average density (AVE2) to a density of each text element area (word center area).

At block 306, the density of the current word center area is calculated. This is referred to as the local word density. The local word density can be calculated as the sum of normalized pixel values in the current word center area on Image_0X, divided by the total number of all pixels (black and white) in the current word center area on Image_0X. Other averaging techniques can be used to calculate the current word center area.

At block 308, the local word density is compared to AVE2. At block 308, it is possible to calculate the difference between the local word density and AVE2 as local word density minus AVE2. The result of block 308 is no (block 308:NO) if the difference exceeds a threshold (delta2). The result of block 308 is yes (block 308:YES) if the difference exceeds the threshold.

If the local word density is not greater than AVE2+delta2 (block 308:NO), it is determined that the word center area does not correspond to a word in bold, and the process proceeds to block 312. If the local word density>AVE2+ delta2 (block 308:YES), it is determined at block 310 that the current word center area corresponds to a word in bold. As a result of this determination, location and/or contents of the word may be saved in memory device 14 (FIG. 24). The location can be a page number, a line number, and/or coordinates of the word in a page. For example, the location and/or contents may be saved in a lookup table in memory device 14. Alternatively or additionally, an output image (Image_X) may be encoded with a tag that distinguishes a bold region in the input image (Image_0) from other regions in the input image as having a word in bold. The bold region corresponds to the word within the current word center area. The tag may include a page number, a line number, and/or coordinates of the word in a page.

The process proceeds to block 312. At block 312, the process checks whether there is another word center area that remains to be processed. If yes (block 312:YES), the next word center area is processed. If not (block 312:NO), the process returns to FIG. 2, block 214. At block 214, the process checks whether there is another bounding box that remains to be processed. If not (block 214:NO), the process returns to FIG. 1 and may end. If yes (block 214:YES), the next bounding box is processed.

The process of FIG. 3 described above is performed when the current bounding box does not contain Asian language text (block 213:NO). The process of FIG. 4 described next is performed when the current bounding box contains Asian language text or All Caps (block 213:YES). As shown in FIG. 2, when the current bounding box contains Asian language text or All Caps, the process proceeds from block 213 to FIG. 4.

Figure 4:
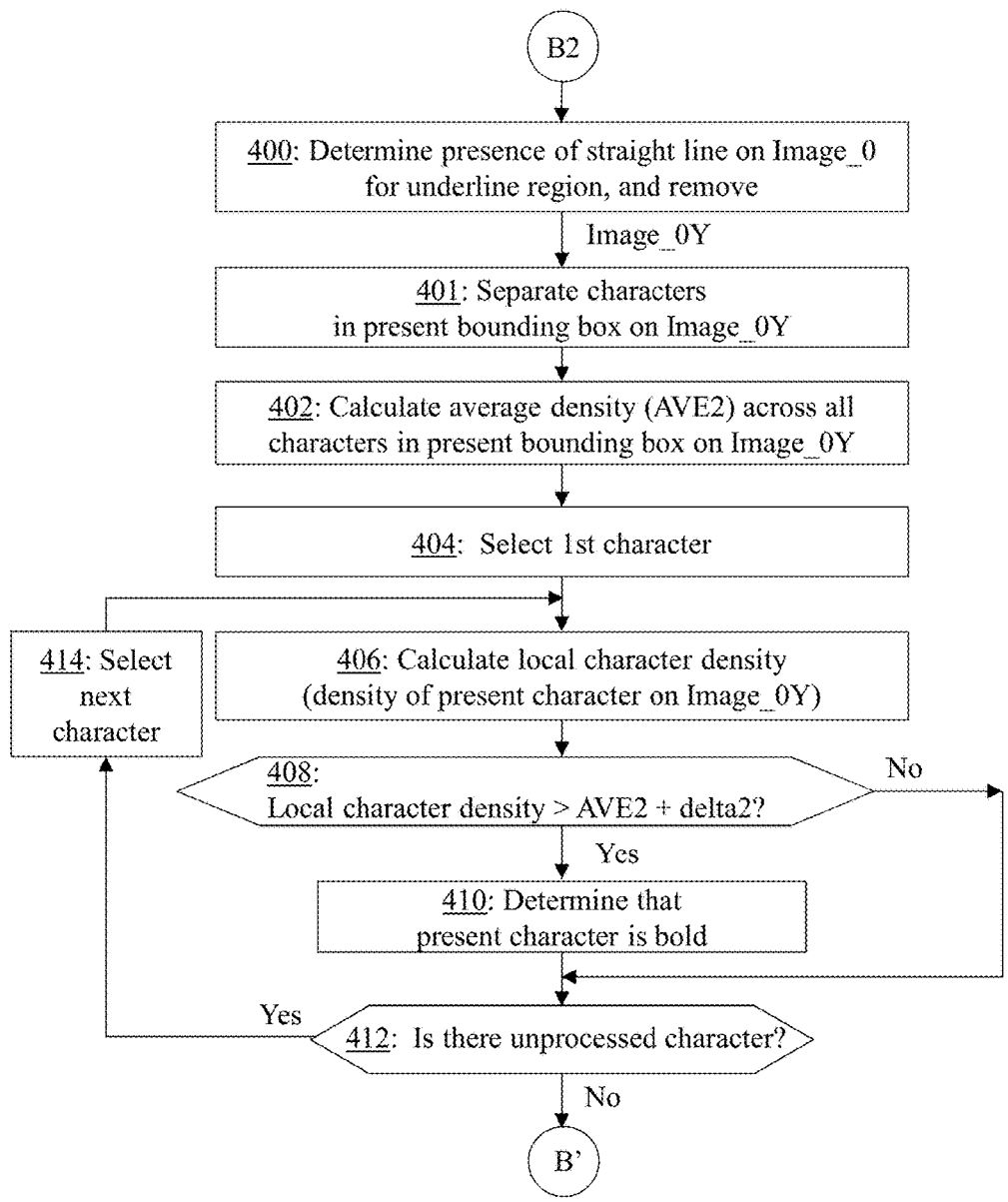
FIG. 4 is a flow diagram showing a subprocess of FIG. 2.

When at FIG. 4, it has already been ascertained that the current bounding box (which represents a line of text) contains characters that are bold (block 210) and that the bounding box contains Asian language text (block 213). Applicant has found that underlines may adversely affect the determination for bold characters in Asian language text, so underlines can be disregarded during processing to increase effectiveness and efficiency of the process.

Figure 19:
FIG. 19 shows Asian language text with an underline.

FIG. 19 shows an example of Asian language text. The right side of the figure shows a portion of Image_3 (the result of horizontal morphological dilation at block 200) in which a bounding box was calculated for a cluster. The left side of the figure shows the Asian language text from Image_0 that corresponds to the same bounding box.

At block 400 in FIG. 4, it is determined whether a horizontal straight line is present in Image_0 for the current bounding box. The result from block 104 in FIG. 1 could be used for this determination. Alternatively, another straight line determination algorithm could be performed at block 400. Block 400 identifies any underline that might be present in the current bounding box.

Figure 20:
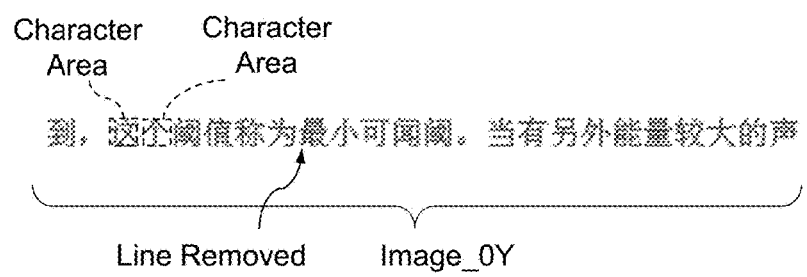
FIG. 20 shows the Asian language text of FIG. 19 with the underline removed.

At block 401, any underline identified at block 400 is eliminated from Image_0 for the current bounding box to generate Image_0Y, as shown in FIG. 20. Also, characters are separated. Each group of marks situated relatively close to each other defines a character area. FIG. 20 shows two example character areas that have been defined in the current bounding box on Image_0Y. Note that none of the character areas in Image_0Y will have an underline that may have been present in Image_0 (FIG. 19). The extent of a character area may be the smallest possible box that encloses the marks of the character.

The characters in each bounding box are examples of text elements. The character areas are examples of text element areas. The current bounding box is divided by numerous text element areas (character areas), which may not cover the current bounding box entirely. For example, spaces between characters may be excluded from character areas to increase effectiveness and efficiency of subsequent subprocesses at blocks 402, 406, and 408.

At block 402, an average density (AVE2) is calculated across all character areas in the current bounding box. The current bounding box is defined at block 204 or 216 of FIG. 2. AVE2 can be calculated as the sum of normalized pixel values added together from all character areas in the current bounding box on Image_0Y, divided by the total number of all pixels (black and white) added together from all character areas in the current bounding box on Image_0Y. Other averaging techniques can be used to calculate AVE2 across all character areas. Image_0Y is the same as Image_0 except that any underline present in Image_0 is absent from Image_0Y.

AVE2 at block 402 is an example of a second average density. AVE2 is calculated from Image_0Y. This arises from the bounding boxes being on Image_0Y, which is not a horizontally compressed image. Also, because of horizontal line removal at block 400, no pixel of an underline is included in calculating AVE2 at block 402.

At block 404, a loop begins for determining whether characters are bolded. The loop begins with the first character area, and subsequent process blocks are repeated until all character areas have been processed. The loop is an example of a process for comparing a second average density (AVE2) to a density of each text element area (character area).

At block 406, the density of the current character area is calculated. This is referred to as the local character density. The local character density can be calculated as the sum of normalized pixel values in the current character area on Image_0Y, divided by the total number of all pixels (black and white) in the current character area on Image_0Y. Other averaging techniques can be used to calculate the local character density.

At block 408, the local character density is compared to AVE2. At block 408, it is possible to calculate the difference between the local character density and AVE2 as local character density minus AVE2. The result of block 408 is no (block 408:NO) if the difference exceeds a threshold (delta2). The result of block 408 is yes (block 408:YES) if the difference exceeds the threshold.

If the local character density is not greater than AVE2+delta2 (block 408:NO), it is determined that the character area does not correspond to a character in bold, and the process proceeds to block 412. The value for delta2 at block 408 may be the same as or different from that for delta2 at block 308.

If the local character density>AVE2+delta2 (block 408:YES), it is determined at block 410 that the current character area corresponds to a character in bold. As a result of this determination, location and/or contents of the character may be saved in memory device 14 (FIG. 24). The location can be a page number, a line number, and/or coordinates for the character in a page. For example, the location and/or contents may be saved in a lookup table in memory device 14. Alternatively or additionally, an output image (Image_X) may be encoded with a tag that distinguishes a bold region in the input image (Image_0) from other regions in the input image as having a character in bold. The bold region corresponds to the character in the current character area. The tag may include a page number, a line number, and/or coordinates for the character in a page.

The process proceeds to block 412. At block 412, the process checks whether there is another character area that remains to be processed. If yes (block 412:YES), the next character area is processed. If not (block 412:NO), the process returns to FIG. 2, block 214. At block 214, the process checks whether there is another bounding box that remains to be processed. If yes (block 214:YES), the next bounding box is processed. If not (block 214:NO), the process returns to FIG. 1 and may end.

Instead of ending, the location of bold text (bold words identified in FIG. 3 or bold characters identified in FIG. 4) may be encoded into the input image (Image_0) to generate an output image (Image_X). The output image may form part of an electronic document. The output image or electronic document may be saved in memory device 14 (FIG. 24), and/or transmitted via network I/F 22 to network 24.

The method of FIG. 1 may be summarized as follows. Bounding boxes are based on clusters resulting from horizontal compression (block 100) followed by horizontal morphological dilation (block 200), and bounding boxes, based on clusters, are processed individually according to FIG. 2 to determine if any contain words or characters in bold. The current bounding box is eliminated when the difference between the local box density and average density across all bounding boxes (AVE1) does not exceed a threshold value (delta1). If greater than the threshold value, each word (groups of letters) in the bounding box is evaluated according to FIG. 3 to determine whether the word is bold, or each character in Asian language text in the bounding box is evaluated according to FIG. 4 to determine whether the character is bold. Processes in FIGS. 3 and 4 are based on images (Image_0X and Image_0Y) that have not been horizontally compressed.

Figure 21:
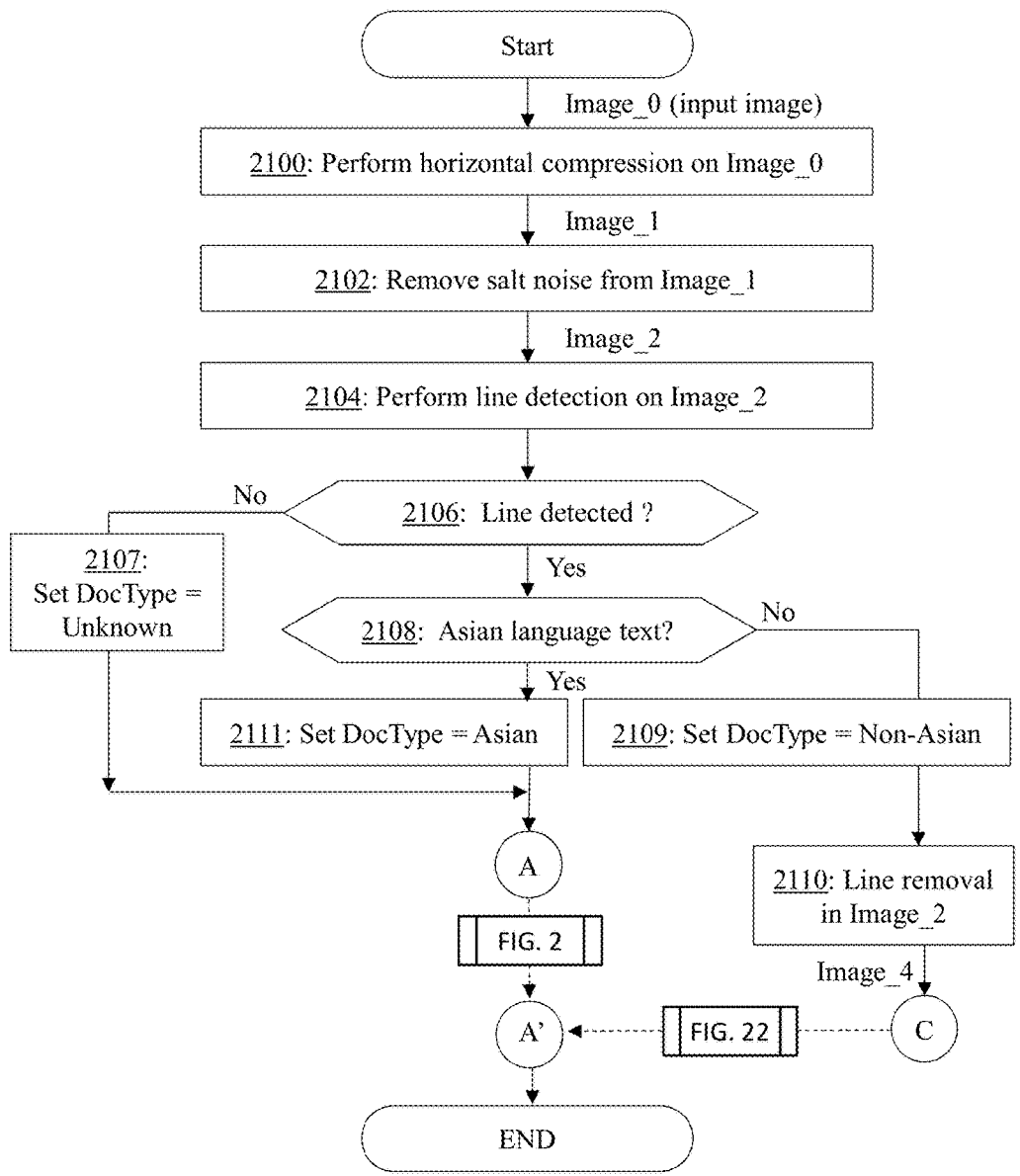
FIG. 21 is a flow diagram showing an example process for identifying emphasized text in an electronic document.
Figure 22:
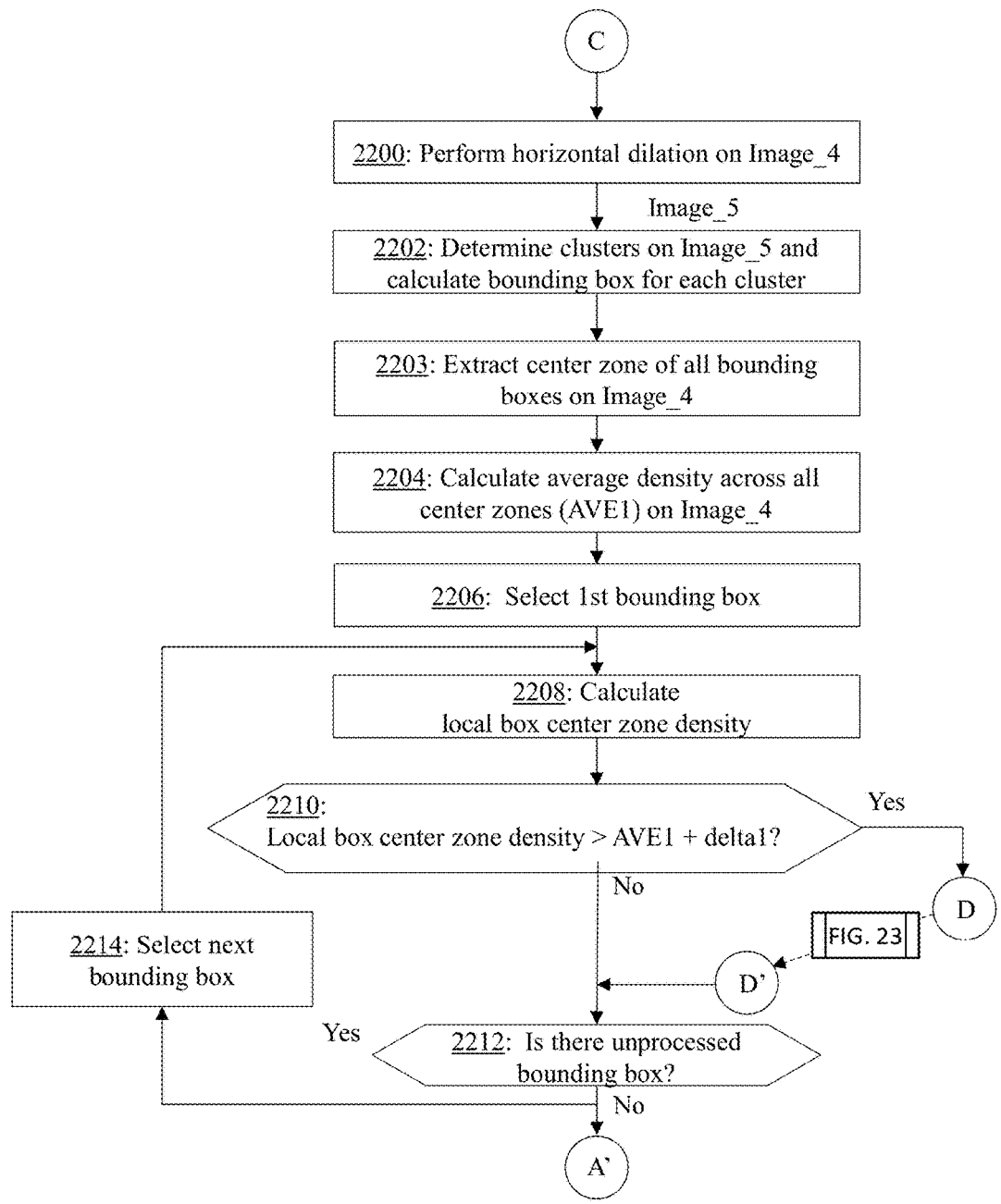
FIG. 22 is a flow diagram of a subprocess of FIG. 21.

FIG. 21 shows another example method for identifying emphasized text in an electronic document. FIG. 21 may be summarized as follows. If there is no underline or if Asian language text is present, the method for identifying emphasized text proceeds as in FIGS. 2-4. Otherwise, the method proceeds according to FIGS. 22 and 23, which use a horizontally compressed image for density calculations. Using a horizontally compressed image may conserve computing resources, increase effectiveness, and reduce processing time, as compared to the process of FIGS. 2 and 3. In FIG. 22, the current bounding box is eliminated when the difference between the local box density and average density across all bounding boxes is not greater than a threshold value. Average density is calculated from horizontally compressed text. A bounding box, which has not been eliminated, is further processed to search for a word in bold according to FIG. 24 based on horizontally compressed text.

Referring again to FIG. 21, at block 2100 input text image (Image_0) is horizontally compressed to generate Image_1. The descriptions for horizontal compression at block 100 apply here. At block 2102, salt noise is removed from Image_1 to generate Image_2. Descriptions for noise removal at block 102 apply here. At block 2104, horizontal line detection is performed on Image_2. Descriptions for line detection at block 104 and FIG. 16A apply here.

At block 2106, the process checks whether an underline has been detected at block 2104. When an underline is detected, location and/or contents of the word or character associated with the underline may be saved in memory device 14 (FIG. 24). The location can be a page number, a line number, and/or coordinates in a page for the word or character associated with the underline. For example, the location and/or contents may be saved in a lookup table in memory device 14. Alternatively or additionally, an output image (Image_X) may be encoded with a tag that distinguishes an underline region in the input image (Image_0) from other regions in the input image as having an underlined word or character. The tag may include a page number, a line number, and/or coordinates in a page for the word or character associated with the underline.

If no underline was detected (block 2106:NO), the process proceeds to FIG. 2. If an underline was detected (block 2106:YES), the process checks at block 2108 whether Asian language text is present. Descriptions for Asian language text determination at block 213 and FIGS. 16A, 16B, and 17 apply here. If Asian language text is present, DocType is set to Asian at block 2111, and the process proceeds to FIG. 2. Otherwise, DocType is set to Non-Asian at block 2109, and the process proceeds to block 2110.

At block 2110, the underline is removed from Image_2 to generate Image_4, and the process proceeds to FIG. 22. Note that Image_4 has horizontally compressed text, as it is derived from the process of block 2100. Also, Image_4 does not contain Asian language text as a result of block 2108.

At block 2200, a horizontal morphological dilation is performed on Image_4 to generate Image_5. Image_5 is an example of a horizontally dilated image. Descriptions for horizontal morphological dilation at block 200 in FIG. 2 apply here. Image_5 contains clusters arising from horizontal morphological dilation of Image_4. The clusters facilitate accurate calculation of bounding boxes each corresponding to a line of text.

At block 2202, the clusters in Image_5 are determined. In other words, clusters are identified throughout Image_5. After a cluster is identified, its bounding box is calculated. The bounding boxes identified in Image_5 do not overlap.

At block 2203, the horizontal center zone is extracted from each bounding box on Image_4. Descriptions for extracting the center zone at block 300 in FIG. 3 may apply here. Both Image_4 and Image_5 are horizontally compressed, but only Image_5 was subjected to morphological dilation to generate clusters (each representing a line of text) from which bounding boxes are calculated. Now at block 2203, the calculated bounding boxes are applied to Image_4 to extract center zones containing lines of horizontally compressed text from which fractional top and bottom parts of letters have been clipped off.

At block 2204, an average density (AVE1) across all bounding box center zones is calculated. The pixels in the upper and lower zones of the bounding boxes are not included in the calculation. AVE1 can be calculated as the sum of normalized pixel values added together from all bounding box center zones on Image_4, divided by the total number of all pixels (black and white) added together from all bounding box center zones on Image_4. Other averaging techniques can be used to calculate AVE1 across all bounding box center zones.

AVE1 is an example of a first average density. AVE1 is calculated from Image_4. This arises from the bounding boxes being on Image_4, which is a horizontally compressed image. Also, because of horizontal line removal at block 2110 and/or removal of lower zones at block 2203, any underline detected at block 2104 is not used in calculating AVE1 at block 2204.

At block 2206, a loop begins for determining whether the bounding box center zones contain a word in bold. The loop begins with the first bounding box center zone, and subsequent process blocks are repeated until all bounding box center zones have been processed. The loop is an example of a process for comparing the average density (AVE1) to a density of each of the bounding boxes.

At block 2208, a density is calculated for the portion of Image_4 within the current bounding box center zone. This is referred to as the local box center zone density. The local box center zone density can be calculated as the sum of normalized pixel values in the center zone of the current bounding box on Image_4, divided by the total number of all pixels (black and white) in center zone of the current bounding box on Image_4. Other averaging techniques can be used to calculate the local box center zone density.

AVE1 at block 2210 is another example of a first average density. Both the local box center zone density and AVE1 are calculated from center zones of the bounding boxes and are not calculated from upper and lower zones. None of the upper zones and none of the lower zones are used in the calculating AVE1 at block 2210. This is different from the local box density and AVE1 in FIG. 2, which are calculated from lower, center, and upper zones. Calculations limited to center zones, as in FIG. 22, may conserve computing resources, increase effectiveness, and reduce processing time.

At block 2210, the local box center zone density is compared to AVE1. At block 2210, it is possible to calculate the difference between the local box center zone density as local box center zone density minus AVE1. The result of block 2210 is no (block 2210:NO) if the difference exceeds a threshold (delta1). The result of block 2210 is yes (block 2210:YES) if the difference exceeds the threshold.

If the local box center zone density is not greater than AVE1+delta1 (block 2210:NO), it is determined that the current bounding box does not contain words in bold, and the process proceeds to block 2212. The value for delta1 at block 2210 may be the same as or different from that for delta1 at block 208 in FIG. 2. At block 2212, the process checks whether there is another bounding box that remains to be processed. If not (block 2212:NO), the process returns to FIG. 21 and may end. If yes (block 2212:YES), the next bounding box is processed.

Figure 23:
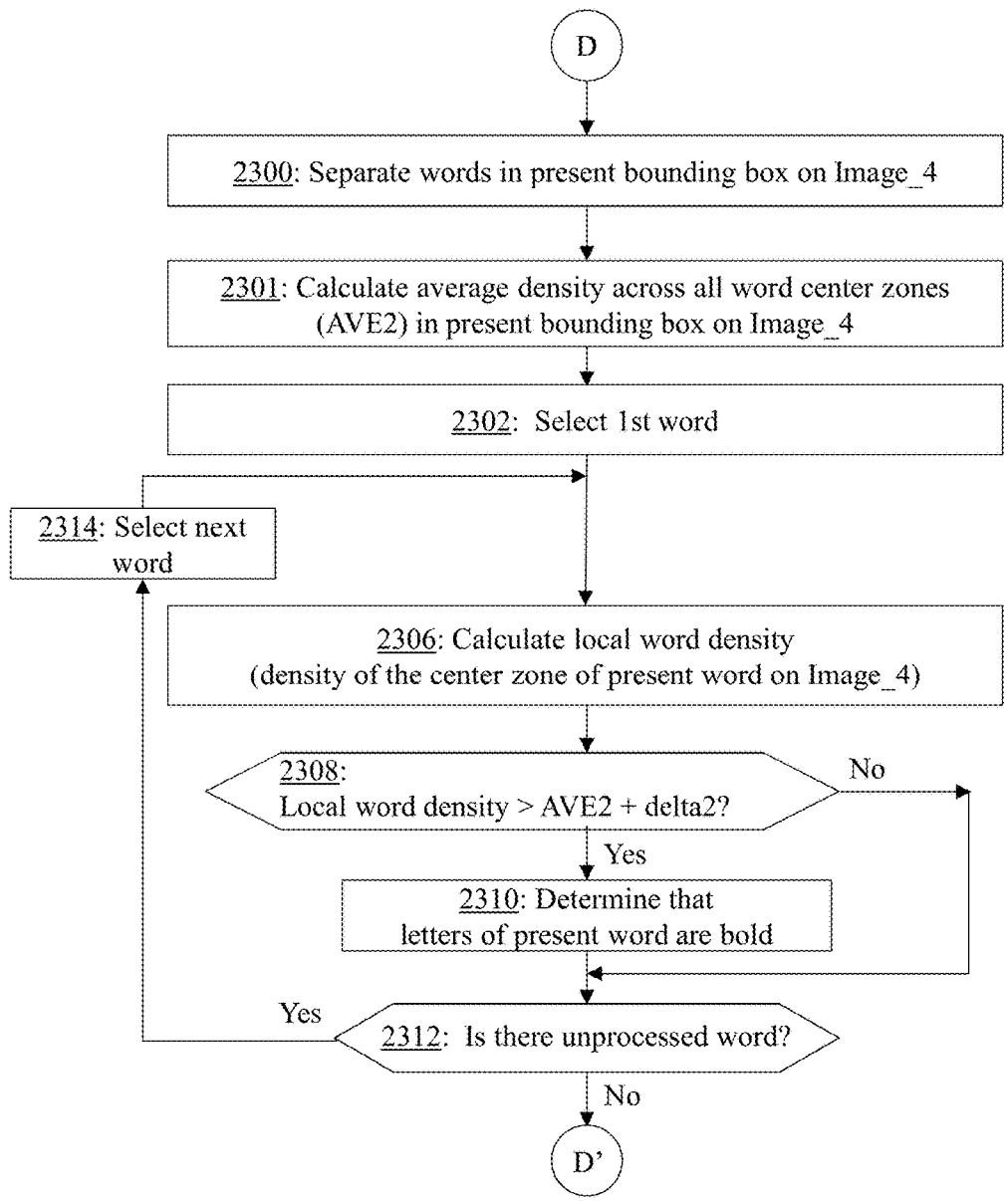
FIG. 23 is a flow diagram of a subprocess of FIG. 22.

If the local box center zone density>AVE1+delta1 (block 2210:YES), the process proceeds to FIG. 23 where individual words within the current bounding box are evaluated.

At block 2300 in FIG. 23, words are separated. Each groups of horizontally compressed letters situated relatively close to each other in Image_4 is identified as a word. The areas occupied by the words are referred to as word center areas since the upper and lower zones are not included. The extent of a word center area may be the smallest possible box that encloses parts of the horizontally compressed letters in the center zone of the bounding box.

The horizontally compressed words in each bounding box are examples of text elements. The word center area is an example of a text element area. The current bounding box is divided by numerous text element areas (word center areas), which may not cover the current bounding box entirely. For example, spaces between words may be excluded from word center areas to increase effectiveness and efficiency of subsequent subprocesses at blocks 2301, 2306, and 308.

At block 2301, an average density (AVE2) is calculated across all word center areas in the current bounding box. The current bounding box is defined at block 2206 or 2214 of FIG. 22. AVE2 can be calculated as the sum of normalized pixel values added together from all word center areas in the current bounding box on Image_4, divided by the total number of all pixels (black and white) added together from all word center areas in the current bounding box on Image_4. Other averaging techniques can be used to calculate AVE2.

AVE2 at block 2301 is an example of a second average density. AVE2 is calculated from Image_4. This arises from the bounding boxes being on Image_4, which is a horizontally compressed image. Also, no pixel of an underline is included in calculating AVE2 at block 2301 because of horizontal line removal at block 2100 and/or because of the elimination of lower zones at block 2203.

At block 2302, a loop begins for determining whether words are bolded. The loop begins with the first word center area, and subsequent process blocks are repeated until all word center areas have been processed. The loop is an example of a process for comparing a second average density (AVE2) to a density of each text element area (word center area).

At block 2306, the density of the current word center area is calculated. This is referred to as the local word density. The local word density can be calculated as the sum of normalized pixel values in the current word center area on Image_4, divided by the total number of all pixels (black and white) in the current word center area on Image_4. Other averaging techniques can be used to calculate the local word density.

The local word density and average density AVE2 are calculated from a horizontally compressed image, namely Image_4. This is different from the local word density and AVE2 in FIG. 3, which are not calculated from a horizontally compressed image. Calculations from a horizontally compressed image, as in FIG. 23, image may conserve computing resources, increase effectiveness, and reduce processing time.

At block 2308, the local word density is compared to AVE2. At block 2308, it is possible to calculate the difference between the local word density and AVE2 as local word density minus AVE2. The result of block 2308 is no (block 2308:NO) if the difference exceeds a threshold (delta2). The result of block 2308 is yes (block 2308:YES) if the difference exceeds the threshold.

If the local word density is not greater than AVE2+delta2 (block 2308:NO), it is determined that the word center area does not correspond to a word in bold, and the process proceeds to block 2312. The value for delta2 at block 2308 may be the same as or different from that for delta2 at blocks 308 and 408.

If the local word density>AVE2+delta2 (block 2308:YES), it is determined at block 2310 that the current word center area corresponds to a word in bold. As a result of this determination, location and/or contents of the word may be saved in memory device 14 (FIG. 24). The location can be a page number, a line number, and/or coordinates in a page for the word in bold. For example, the location and/or contents may be saved in a lookup table in memory device 14. Alternatively or additionally, an output image (Image_X) may be encoded with a tag that distinguishes a bold region in the input image (Image_0) from other regions in the input image as having a word in bold. The bold region corresponds to the word within the current word center area. The tag may include a page number, a line number, and/or coordinates in a page for the word in bold.

The process proceeds to block 2312, where the process checks whether there is another word center area that remains to be processed. If yes (block 2312:YES), the next word center area is processed. If not (block 2312:NO), the process returns to FIG. 22, block 2212. At block 2212, the process checks whether there is another bounding box that remains to be processed. If yes (block 2212:YES), the next bounding box is processed. If not (block 2212:NO), the process returns to FIG. 21 and may end.

Instead of ending, the location of bold text (bold characters or words) may be encoded into the input image (Image_0) to generate an output image (Image_X). The output image may form part of an electronic document. The output image or electronic document may be saved in memory device 14 (FIG. 24), and/or transmitted via network I/F 22 to network 24.

FIG. 24 shows example system 10 configured to perform the processes described above. System 10 can be a server, computer workstation, personal computer, laptop computer, tablet, smartphone, facsimile machine, printing machine, multi-functional peripheral (MFP) device that has the functions of a printer and scanner combined, or other type of machine that includes one or more computer processors and memory.

System 10 includes one or more computer processors 12 (CPUs), one or more computer memory devices 14, one or more input devices 16, and one or more output devices 18. The one or more computer processors 12 are collectively referred to as a processor 12. Processor 12 is configured to execute instructions. Processor 12 may include integrated circuits that execute the instructions. The instructions may be embodied in one or more software modules for performing the processes described above. The one of more software modules are collectively referred to as image analysis program 20.

The one or more computer memory devices 14 are collectively referred to as a memory device 14. Memory device 14 includes any one or a combination of random-access memory (RAM) modules, read-only memory (ROM) modules, and other electronic devices. Memory device 14 may include a mass storage device, such as an optical drive, magnetic drive, or solid-state flash drive. Memory device 14 includes a non-transitory computer readable medium that stores image analysis program 20.

The one or more input devices 16 are collectively referred to as input device 16. Input device 16 can allow a user to enter data and interact with system 10. Input device 16 may include any one or more of a keyboard with buttons, touch-sensitive screen, mouse, electronic pen, and other types of devices. Input device 16 may be used to create the input image (Image_0). Input device 16 may include an optical sensor, such as a CCD sensor, configured to create Image_0 from a physical document page.

The one or more output devices 18 are collectively referred to as output device 18. Output device 18 may include a liquid crystal display, projector, or other type of visual display device. Output device 18 may be used to display the input image (Image_0) or the output image of any process described above. Output device 18 may include an electrostatic printer configured to print the input image on paper.

System 10 includes network interface (I/F) 22 configured to allow system 10 to communicate with other machines through network 24, such as a local area network (LAN), a wide area network (WAN), the Internet, and telephone communication carriers. Network I/F 22 may include circuitry enabling analog or digital communication through network 24. For example, network I/F 22 may be configured to receive input image (Image_0). Network I/F 22 may be configured to transmit the output image of the processes above. The above-described components of system 10 are communicatively coupled to each other through communication bus 26.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A method of identifying emphasized text, the method comprising:
   performing horizontal compression on an input image to generate a horizontally compressed image, the input image comprising lines of text, each line of text comprising a plurality of words or characters;
performing horizontal morphological dilation on the compressed image to form a horizontally dilated image, the horizontally dilated image comprising clusters, each cluster corresponding to a different one of the lines of text;
calculating a bounding box for each cluster, resulting in a plurality of bounding boxes;
calculating a first average density, the first average density calculated across all the bounding boxes;
for each of the bounding boxes, comparing the first average density to a density of the bounding box; and
identifying a specific bounding box, from among the plurality of bounding boxes, as having a word or character in bold, the identifying based on the comparison of the first average density to the density of the specific bounding box.

2. The method of claim 1, wherein the bounding boxes, for calculating the first average density, are on the horizontally compressed image.

3. The method of claim 1, wherein:
each bounding box includes upper and lower zones, at least one of which contains a fractional part of a word or a character, and
none of the upper zones and none of the lower zones are used in the calculating of the first average density.

4. The method of claim 1, further comprising detecting an underline from the compressed image, wherein the bounding boxes, for calculating the first average density, exclude the underline.

5. The method of claim 1, wherein the specific bounding box contains a plurality of text elements, the text elements are words or characters, the specific bounding box is divided by text element areas, each text element area covers a different one of the text elements, and the method further comprises:
calculating a second average density, the second average density calculated across all text element areas in the specific bounding box;
for each text element area, comparing the second average density to a density of the text element area; and
identifying a specific text element, from among a plurality of text elements, as being in bold, the identifying based on the comparison of the second average density to the density of the text element area containing the specific text element.

6. The method of claim 5, wherein the text element areas, for calculating the second average density, are on the input image.

7. The method of claim 5, wherein the text element areas, for calculating the second average density, are on the horizontally compressed image.

8. The method of claim 5, wherein:
each text element area includes upper and lower zones, at least one of which contains a fractional part of one or more of the text elements, and
none of the upper zones and none of the lower zones are used in the calculating of the second average density.

9. The method of claim 5, wherein:
the specific bounding box includes an underline, and
the text element areas, for calculating the second average density, exclude the underline.

10. The method of claim 1, further comprising generating an output image, wherein the output image includes a tag that distinguishes an area within the specific bounding box as having a word or character in bold, the tag distinguishes the area from other areas of the input image which have neither a word nor character in bold.

11. A system of identifying emphasized text, the system comprising:
a processor; and
a memory device in communication with the processor, the memory device storing instructions,
wherein the processor is configured to perform a process to identify emphasized text according to the stored instructions, and the process comprises:
performing horizontal compression on an input image to generate a horizontally compressed image, the input image comprising lines of text, each line of text comprising a plurality of words or characters;
performing horizontal morphological dilation on the compressed image to form a horizontally dilated image, the horizontally dilated image comprising clusters, each cluster corresponding to a different one of the lines of text;
calculating a bounding box for each cluster, resulting in a plurality of bounding boxes;
calculating a first average density, the first average density calculated across all the bounding boxes;
for each of the bounding boxes, comparing the first average density to a density of the bounding box; and
identifying a specific bounding box, from among the plurality of bounding boxes, as having a word or character in bold, the identifying based on the comparison of the first average density to the density of the specific bounding box.

12. The system of claim 11, wherein the bounding boxes, for calculating the first average density, are on the horizontally compressed image.

13. The system of claim 11, wherein:
each bounding box includes upper and lower zones, at least one of which contains a fractional part of a word or a character, and
none of the upper zones and none of the lower zones are used in the calculating of the first average density.

14. The system of claim 11, wherein the process further comprises detecting an underline from the compressed image, and the bounding boxes, for calculating the first average density, exclude the underline.

15. The system of claim 11, wherein the specific bounding box contains a plurality of text elements, the text elements are words or characters, the specific bounding box is divided by text element areas, each text element area covers a different one of the text elements, and the process further comprises:
calculating a second average density, the second average density calculated across all text element areas in the specific bounding box;
for each text element area, comparing the second average density to a density of the text element area; and
identifying a specific text element, from among a plurality of text elements, as being in bold, the identifying based on the comparison of the second average density to the density of the text element area containing the specific text element.

16. The system of claim 15, wherein the text element areas, for calculating the second average density, are on the input image.

17. The system of claim 15, wherein the text element areas, for calculating the second average density, are on the horizontally compressed image.

18. The system of claim 15, wherein:

each text element area includes upper and lower zones, at least one of which contains a fractional part of one or more of the text elements, and none of the upper zones and none of the lower zones are used in the calculating of the second average density.

19. The system of claim 15, wherein:

the specific bounding box includes an underline, and the text element areas, for calculating the second average density, exclude the underline.

20. The system of claim 11, wherein the process further comprises generating an output image, the output image includes a tag that distinguishes an area within the specific bounding box as having a word or character in bold, the tag distinguishes the area from other areas of the input image which have neither a word nor character in bold.

21. A non-transitory computer-readable medium having stored thereon computer readable instructions that, when executed by a processor of a system, cause the system to perform a process for identifying emphasized text, the process comprising:

performing horizontal compression on an input image to generate a horizontally compressed image, the input image comprising lines of text, each line of text comprising a plurality of words or characters;

performing horizontal morphological dilation on the compressed image to form a horizontally dilated image, the horizontally dilated image comprising clusters, each cluster corresponding to a different one of the lines of text;

calculating a bounding box for each cluster, resulting in a plurality of bounding boxes;

calculating a first average density, the first average density calculated across all the bounding boxes;

for each of the bounding boxes, comparing the first average density to a density of the bounding box; and identifying a specific bounding box, from among the plurality of bounding boxes, as having a word or character in bold, the identifying based on the comparison of the first average density to the density of the specific bounding box.

* * * * *